(12) United States Patent
Feria et al.

(10) Patent No.: US 8,948,747 B2
(45) Date of Patent: Feb. 3, 2015

(54) OVERLAPPING CELLS FOR WIRELESS COVERAGE

(71) Applicant: The Boeing Company, Seal Beach, CA (US)

(72) Inventors: Ying J. Feria, Manhattan Beach, CA (US); John M. Sullivan, Manhattan Beach, CA (US); Greg Busche, Rancho Palos Verdes, CA (US); Murat E. Veysoglu, Cypress, CA (US); Lori Shima, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 13/766,273

(22) Filed: Feb. 13, 2013

(65) Prior Publication Data

US 2014/0228036 A1    Aug. 14, 2014

(51) Int. Cl.
*H04W 4/00* (2009.01)
*H04W 16/02* (2009.01)

(52) U.S. Cl.
CPC .................................... *H04W 16/02* (2013.01)
USPC ........... 455/427; 455/429; 455/447; 455/448; 455/449

(58) Field of Classification Search
CPC ...... H04B 7/0617; H04B 7/086; H04B 7/088; H04B 7/0634; H04B 7/0695; H04W 16/14; H04W 16/28; H04W 72/046; H04W 24/02; H04W 16/02
USPC ............... 455/427, 429, 446–449, 11.1–13.4; 342/39
See application file for complete search history.

(56) References Cited

U.S. PATENT DOCUMENTS

| | | | |
|---|---|---|---|
| 5,903,549 A | 5/1999 | von der Embse et al. | |
| 6,823,170 B1 | 11/2004 | Dent | |
| 6,866,231 B2 | 3/2005 | Higgins | |
| 6,993,288 B2 | 1/2006 | de La Chapelle et al. | |
| 7,110,716 B2 | 9/2006 | Rao et al. | |
| 7,376,417 B2 | 5/2008 | Walsh et al. | |
| 2004/0242152 A1 | 12/2004 | Jarett | |
| 2007/0217355 A1 | 9/2007 | de La Chappelle et al. | |
| 2008/0153481 A1 | 6/2008 | Rosen et al. | |
| 2009/0290601 A1 | 11/2009 | Wang et al. | |
| 2011/0211486 A1* | 9/2011 | Goldhammer | 370/252 |
| 2011/0292848 A1* | 12/2011 | Roy et al. | 370/280 |

(Continued)

OTHER PUBLICATIONS

Kumar, V, Mobile Computing Cellular Technology, Computer Science University of Missouri-Kansas City, MO, US, Sep. 3, 2002, 8 pgs.

*Primary Examiner* — Allahyar Kasraian
(74) *Attorney, Agent, or Firm* — Womble, Carlyle, Sandridge & Rice, LLP

(57) ABSTRACT

A system is provided for overlapping cells for wireless coverage in a cellular communication system. The system includes a beam-weight generator and beamformer coupled to the beam-weight generator. The beam-weight generator is configured to generate a plurality of beam weights including at least first and second sets of beam weights. And the beamformer is configured to apply the first and second sets of beam weights to signals in a cellular communication system. The cellular communication system provides coverage over a geographic region divided into cells arranged in overlapping first and second layers of cells having criteria optimized for communication by respective, distinct first and second types of user terminals. In this regard, the criteria are reflected in the first and second sets of beam weights.

14 Claims, 5 Drawing Sheets

(56) References Cited

U.S. PATENT DOCUMENTS

2012/0274514 A1   11/2012  Petersson et al.
2013/0163705 A1*  6/2013   Stirland ..................... 375/346
2013/0194950 A1*  8/2013   Haghighat et al. ............ 370/252
2013/0215989 A1*  8/2013   Miyatani et al. .............. 375/267
2014/0099960 A1*  4/2014   Ahmad et al. ................ 455/438
2014/0126483 A1*  5/2014   Novak et al. .................. 370/329

* cited by examiner

OVERLAPPING CELLS FOR WIRELESS COVERAGE

TECHNOLOGICAL FIELD

The present disclosure relates generally to cellular communication systems and, in particular, to overlapping cells for wireless coverage in a cellular communication system.

BACKGROUND

Wireless communications access, on which our society and economy is growing increasingly dependent, is becoming pervasive in all aspects of daily societal functions. For example, wireless communication has become increasingly available to users on board mobile platforms such as land vehicles, aircraft, spacecraft, watercraft or the like. Wireless communication services for passengers of mobile platforms include Internet access, e.g., e-mail and web browsing, live television, voice services, virtual private network access and other interactive and real time services.

Wireless communication platforms for remote, hard to access, or mobile user terminals, e.g., mobile platforms, often use communication satellites that can provide service coverage over large geographic footprints, often including remote land-based or water-based regions. Generally, base stations, e.g., a ground base station, send information (e.g., data) to the user terminals through a bent pipe via one or more satellites. More specifically, the base stations send information on a forward link to the satellite that receives, amplifies and re-transmits the information to an antenna of one or more fixed or mobile user terminals. The user terminals, in turn, can send data back to the base stations via the satellite. The base stations can provide the user terminals with links to the Internet, public switched telephone networks, and/or other public or private networks, servers and services.

Modern satellites and other cellular communication systems often employ a number of spot beams providing a beam laydown that forms coverage over a geographic region that may be divided into a plurality of cells. In a communication system using spot beams, the same frequency may be used at the same time in two or more cells. These beams may be configured to maintain a predetermined co-polar isolation (e.g., carrier-to-interference ratio) value in order to minimize the interference among beams. This is called spatial isolation and spatial reuse. In one typical parlance, each spot beam may be assigned a color to create a color pattern that matches a frequency reuse pattern. Identical frequencies, then, may be reused by different beams with the same color.

These cellular communication systems often face a number of challenges in optimizing services for a variety of types of user terminals, while staying within system constraints. The systems often require high system capacity to provide simultaneous voice and data. Links providing voice services are often noise dominate and require high satellite antenna gain, whereas those providing data services often require optimization of opposing satellite-antenna criteria. That is, data links are often interference dominant and require high side-lobe suppression to provide a high signal-to-interference ratio.

Many modern cellular communication systems are often configured to permit communication by a variety of types of user terminals in the coverage region, which may benefit from different, sometimes-opposing satellite-antenna criteria for optimal performance. The different types of terminals may also benefit from different frequency reuse patterns and/or cell sizes. Small-sized handheld terminals often benefit from higher satellite antenna gain to close links with the satellite, and may also benefit from a medium-to-high-order frequency reuse with mid-sized cells. Mid-sized portable and vehicular terminals on the other hand often benefit from higher side-lobe suppression to provide a correspondingly higher signal-to-interference ratio, as well as a higher-order frequency reuse to provide higher-rate data services to a higher-density user base with micro-sized cells. And large-sized aeronautical and maritime terminals often benefit from a lower-order frequency reuse to provide data services to a lower-density user base with large-sized cells. And aeronautical terminals in particular often travel at high speeds, and may benefit from larger-sized cells to reduce the frequency of beam-to-beam handovers as they travel over the geographic region.

BRIEF SUMMARY

Example implementations of the present disclosure are generally directed to a system and an associated method of overlapping cells for wireless coverage in a cellular communication system. According to one aspect of example implementations, the system includes a beam-weight generator and beamformer coupled to the beam-weight generator. The beam-weight generator is configured to generate a plurality of beam weights including at least first and second sets of beam weights. And the beamformer is configured to apply the first and second sets of beam weights to signals in a cellular communication system. The cellular communication system provides coverage over a geographic region divided into cells arranged in overlapping first and second layers of cells having criteria optimized for communication by respective, distinct first and second types of user terminals. In this regard, the criteria are reflected in the first and second sets of beam weights.

In one example, the criteria include satellite antenna gain and side-lobe suppression. In this example, the first and second layers of cells may have different antenna gain and side-lobe suppression, such as the first layer of cells being optimized for antenna gain, and the second layer of cells being optimized for side-lobe suppression.

In one example, the criteria include a cell size; and in this example, the first layer of cells may include first-sized cells, and the second layer of cells may include different, second-sized cells.

In one example, the criteria may include a frequency reuse pattern; and in this example, cells of the first layer of cells may be arranged in a first frequency reuse pattern, and cells of the first layer of cells may be arranged in a different, second frequency reuse pattern.

In a further example, the first and second layers of cells may be arranged in overlapping P-cell and Q-cell frequency reuse patterns, with the P-cell frequency reuse pattern being for communication of control channels, and the Q-cell frequency reuse pattern being for communication of traffic channels exclusive of control channels. In this further example, any traffic channel of the Q-cell frequency reuse pattern may be assignable through a control channel of the P-cell frequency reuse pattern. In various instances, Q may be greater than P, and cells of the Q-cell frequency reuse pattern may be smaller in size than those of the P-cell frequency reuse pattern. At least some of the cells of the Q-cell frequency reuse pattern may overlap one cell of the P-cell frequency reuse pattern, and other cells of the Q-cell frequency reuse pattern may overlap more than one cell of the P-cell frequency reuse pattern.

In one example, the criteria may include satellite-antenna criteria, cell size and/or frequency reuse pattern, with the satellite-antenna criteria including antenna gain and side-lobe suppression. In this example, the first layer of cells may include first-sized (e.g., mid-sized) cells arranged in a first frequency reuse pattern, and may be optimized for antenna gain. And the second layer of cells may include second-sized (e.g., micro-sized) cells arranged in a different, second frequency reuse pattern, and may be optimized for side-lobe suppression. In this example, the second-sized cells may be smaller in size than the first-sized cells.

In one example, the plurality of beam weights may further include a third set of beam weights. In this example, the beamformer may be configured to further apply the third set of beam weights to signals in the cellular communication system providing coverage over the geographic region divided into cells arranged in overlapping first, second and third layers of cells having criteria optimized for communication by respective, distinct first, second and third types of user terminals. Similar to before, the criteria may be reflected in the first, second and third sets of beam weights.

In a further example, the first and second layers of cells may include respective ones of first-sized (e.g., mid-sized) and second-sized (micro-sized) cells arranged in different first and second frequency reuse patterns, and may be optimized for respective ones of antenna gain and side-lobe suppression. The third layer of cells, then, may include third-sized (e.g., large-sized) cells arranged in a different, third frequency reuse pattern, and may be optimized for side-lobe suppression. In this example, the first-sized cells may be smaller in size than the third-sized cells, and the second-sized cells may be smaller in size than the first-sized cells.

In other aspects of example implementations, a method is provided for overlapping cells for wireless coverage in a cellular communication system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
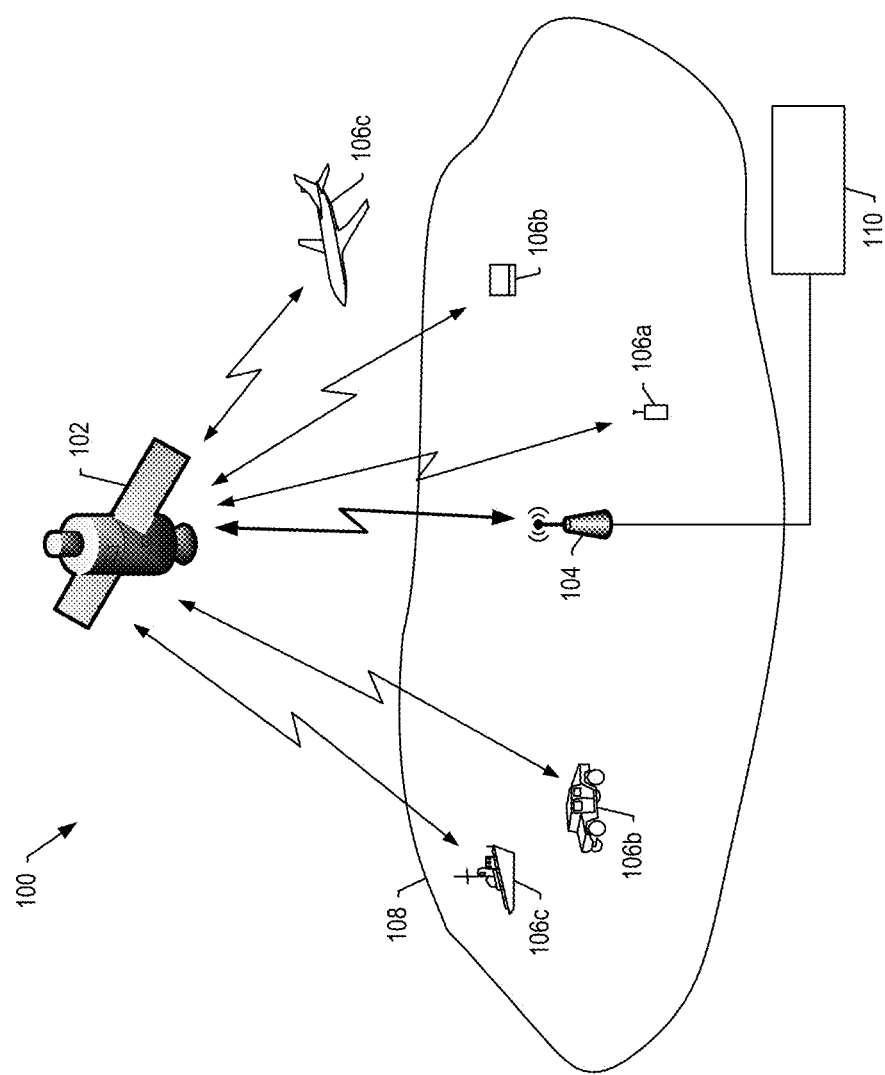
FIG. 1 illustrates a cellular communication system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to dimensions of or relationships between components. Those and other similar relationships may be absolute or approximate to account for variations that may occur, such as those due to engineering tolerances or the like. Like reference numerals refer to like elements throughout.

The present disclosure relates to overlapping cells for wireless coverage in a cellular communication system. Example implementations of the present disclosure may be shown and described herein with reference to a satellite communication system. It should be understood, however, that the present disclosure may be equally applicable to any of a number of other types of cellular communication systems. For example, various example implementations may be equally applicable to a terrestrial cellular communication system in which base stations and user terminals communicate directly with one another without use of a satellite. As described herein, the term "satellite" may be used without generality and include other types of relay and distribution apparatuses, which in various examples may be located on land or onboard a mobile platform (e.g., land vehicle, aircraft, spacecraft, watercraft). Thus, although the communications system of example implementations may be shown and described as including one or more "satellites," the term may be used more broadly to include one or more relay and distribution apparatuses.

FIG. 1 illustrates one example of a cellular communication system 100 in accordance with various example implementations of the present disclosure. As shown, the cellular communication system may be a satellite communication system including one or more satellites 102, one or more satellite ground base stations 104 and a plurality of user terminals 106. As explained in greater detail below, the user terminals may be of a variety of different types such as small-sized handheld terminals 106a, mid-sized portable and vehicular terminals 106b, and/or large-sized aeronautical and maritime terminals 106c. The satellite may cover a geographic region 108 in which the base station and one or more user terminals may be located. The base station may be coupled to or otherwise part of one or more networks 110, such as the Internet, a public switched telephone network (PSTN), a public land mobile network (PLMN), private networks such as corporate and government networks, and/or other servers and services.

In various examples, the satellite 102 and base station 104 may enable communication between user terminals 106 and the network 110. In this regard, the base station may receive information (e.g., data) from the network, and communicate the information to the satellite. The satellite may in turn transmit or relay the information to one or more user terminals in spot beams. Conversely, for example, the satellite may receive information from a user terminal, and communicate the information to the base station, which may in turn transmit or relay the information to the network. This type of communication may at times be referred to as "bent-pipe" communication. It should be understood, however, that example implementations may also be applicable to other types of satellite systems, such as those with on-board packet switching.

The satellite 102 may employ a number of spot beams providing a beam laydown that forms coverage over the geographic region 108, which may be divided into a plurality of cells. The beams in one example may cover respective cells of the cellular communication system. Each beam may be assigned some beam indicia to create a pattern that matches a frequency reuse pattern for the satellite. In some examples, the beam indicia may be colors or cells, or may be alpha, numeric or alpha-numeric characters. In accordance with example implementations of the present disclosure, the satellite may use same frequency at the same time for two or more cells. That is, the satellite may reuse same frequency in different beams with the same color. In one example, the reuse distance may be measured from the center of one beam to the edge of another beam with the same color.

As explained in the background section, modern cellular communication systems often face a number of challenges in optimizing services for a variety of types of user terminals, while staying within system constraints. The systems often require high system capacity to provide simultaneous voice and data that may opposingly benefit from different satellite-antenna criteria such as high satellite antenna gain, and high side-lobe suppression to provide a high signal-to-interference ratio. Different types of user terminals 106 may also require different, sometimes-opposing satellite-antenna criteria. These different types of user terminals may further benefit from different frequency reuse patterns and/or cell sizes. Small-sized handheld terminals 106a may generally provide voice and lower-rate data services, and include a smaller antenna with lower gain. These terminals may benefit from higher satellite antenna gain to close links with the satellite 102, and may also benefit from a medium-to-high-order frequency reuse with mid-sized cells.

Mid-sized portable and vehicular terminals 106b may generally provide higher-rate data services. These terminals often benefit from higher side-lobe suppression to provide a correspondingly higher signal-to-interference ratio. These terminals are also often characterized by a higher-density user base over the geographic region covered by the satellite, and may benefit from a higher-order frequency reuse to provide the higher-rate data services to its user base with micro-sized cells. In contrast, large-sized aeronautical and maritime terminals 106c are often characterized by a lower-density user base and may benefit from a lower-order frequency reuse. And aeronautical terminals in particular often travel at high speeds, and may benefit from larger-sized cells to reduce the frequency of beam-to-beam handovers as they travel over the geographic region.

Conventional cellular communication systems provide a single layer of equally-sized cells arranged in a single frequency reuse pattern for coverage over a geographic region. The system may be optimized for a number of different satellite-antenna criteria, such as satellite antenna gain, side-lobe suppression (signal-to-interference ratio) or some combination of both to a lesser degree, usually one type of optimization per large region. The cell size and frequency reuse pattern may also be set by the single layer of cells. These criteria including satellite-antenna criteria, cell size and/or frequency reuse pattern may be optimized for one type of service (voice, data) and/or user terminal 106. Other types of services and/or user terminals, on the other hand, may suffer suboptimal performance.

The cellular communication system 100 of example implementations of the present disclosure may therefore provide multiple layers of overlapping cells that may be optimized for respective, different types of service and/or user terminals 106. For example, the cellular communication system may optimize criteria (e.g., satellite-antenna criteria, cell size and/or frequency reuse pattern) for respective, different types of service and/or user terminals. In some examples, all of the criteria optimized by a layer may differ from the criteria optimized by another layer. And in some examples, at least some but not all of the criteria optimized by a layer may be the same criteria optimized by another layer. By providing multiple layers of overlapping cells that optimize different criteria, the cellular communication system of example implementations of the present disclosure may provide services to different types of terminals in the same geographic region 108 without compromise.

Figure 2:
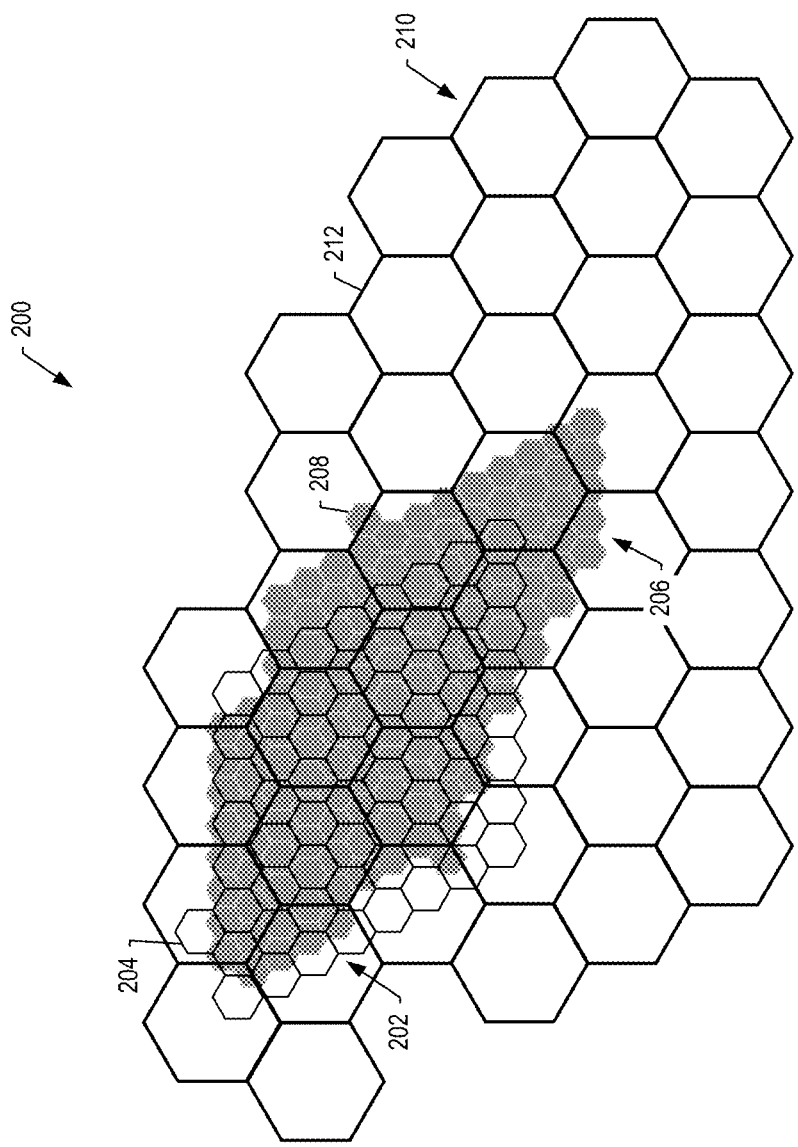
FIG. 2 illustrates a geographic region including portions of three layers of overlapping cells in accordance with one example implementation of the present disclosure.

FIG. 2 illustrates a geographic region 200 including portions of three layers of overlapping cells in accordance with one example implementation of the present disclosure. As shown, the system may provide a first layer 202 including first-sized cells 204 arranged in a first frequency reuse pattern with satellite-antenna criteria optimized in a first manner, and a second layer 206 including second-sized cells 208 arranged in a second frequency reuse pattern with satellite-antenna criteria optimized in a second manner. A third layer 210 may include third-sized cells 212 arranged in a third frequency reuse pattern with satellite-antenna criteria optimized in a third manner. In one example, the first frequency reuse pattern may be lower order than the second frequency reuse pattern, but higher order than the third frequency reuse pattern. Similarly, in one example, the first-sized cells may be larger than the second-sized cells, but smaller than the third-sized cells. Further, in one example, one or more satellite-antenna criteria may differ between one or more layers of cells.

In a more particular example, the first layer 202 may optimize criteria for small-sized handheld terminals 106a. The first layer of cells may include mid-sized cells 204 arranged in a first frequency reuse pattern (e.g., seven-color pattern), and may be optimized for antenna gain. The second layer 206 may optimize criteria for mid-sized portable and vehicular terminals 106b. The second layer of cells may include micro-sized cells 208 arranged in a different, second frequency reuse pattern (e.g., twenty-eight-color pattern), and may be optimized for side-lobe suppression. The third layer 210 may optimize criteria for large-sized aeronautical and maritime terminals 106c. The third layer of cells may include large-sized cells 212 arranged in a different, third frequency reuse pattern (e.g., four-color pattern), and may be optimized for side-lobe suppression.

Figure 3:
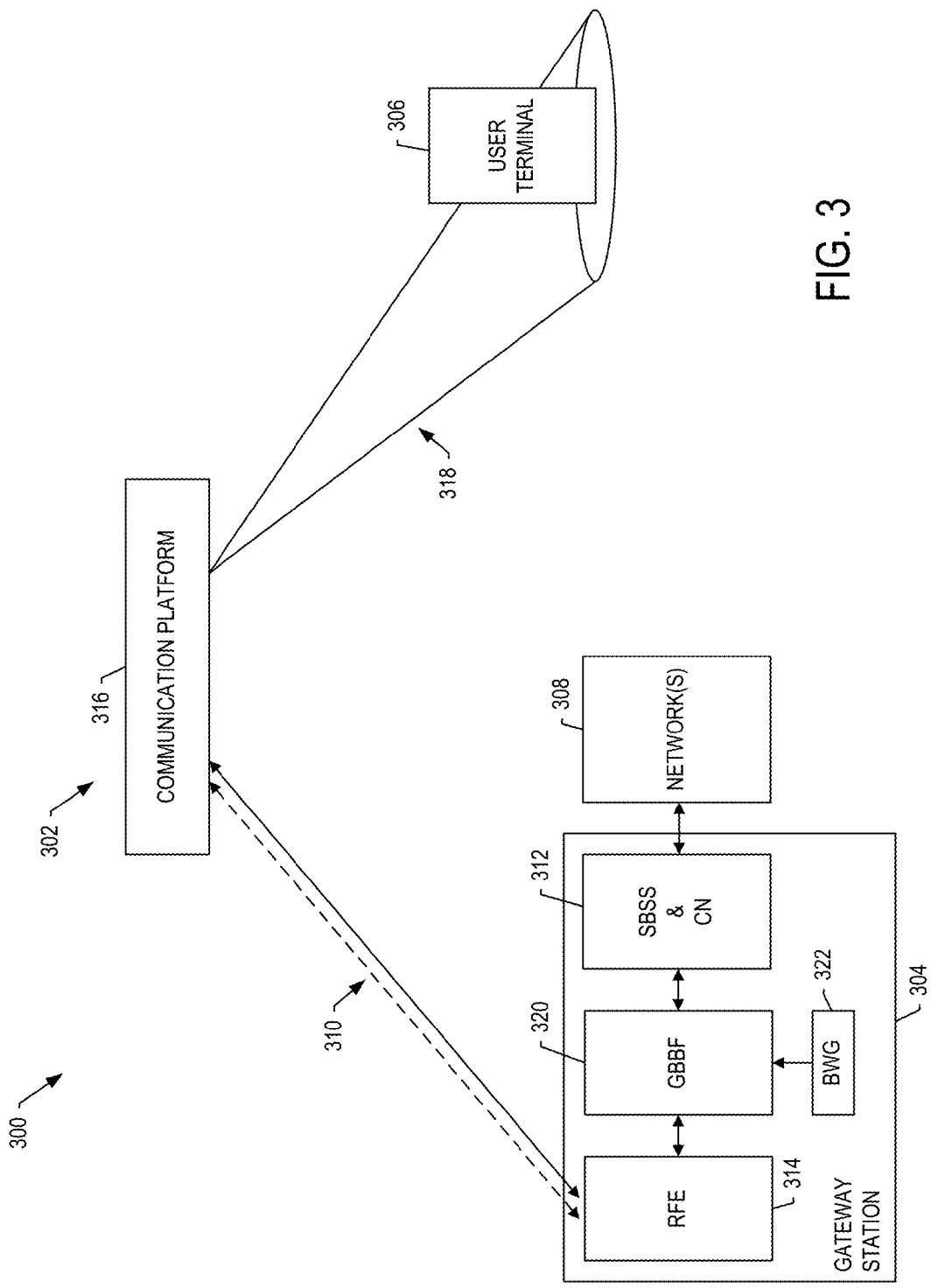
FIG. 3 is a schematic block diagram of a cellular communication system according to one example implementation of the present disclosure.

FIG. 3 more particularly illustrates a cellular communication system 300 that in one example may correspond to the cellular communication system 100 of FIG. 1. As shown, the cellular communication system may include one or more satellites 302, one or more satellite ground base or gateway stations 304 and a plurality of user terminals 306, which in one example may correspond to respective ones of satellite 102, ground base station 104 and user terminals 106. The gateway station may receive information (e.g., data) from one or more networks 308 (e.g., network 110), and communicate the information to the satellite over one or more feeder links 310, and vice versa. As shown, the gateway station may include a gateway or satellite base sub-system (SBSS) and core network (CN) 312 configured to enable communication with the network, and may include radio-frequency (RF) equipment (RFE) 314 configured to enable communication with the satellite. And as explained below, the gateway station may include a ground-based beamformer (GBBF).

The satellite 302 may transmit or relay information from the gateway station 304 to one or more user terminals 306, and vice versa. The satellite may include a communication platform 316 that carries an antenna system including an array of antenna feeds (or feed elements), and that may include phased array or reflector. This feed array may be configured to receive information from the gateway station 304, and transmit or relay the information to one or more user terminals 306 in spot beams 318 over one or more user links.

In various examples, the communication platform may further include appropriate circuitry configured to apply an antenna gain to "close" the user link with a user terminal.

The satellite 302 may employ a number of spot beams providing a beam laydown that forms coverage over a geographic region (e.g., region 108), which may be divided into a plurality of cells. To at least partially facilitate this directional transmission or reception, the cellular communication system 300 may include a beamformer configured to adjust the amplitude and phase of each path to each feed element according to one or more beam coefficients, beam weights or the like. The beamformer may therefore produce beams that may be output to the satellite via respective ports (sometimes referred to as "beamports") of the beamformer. The beamformer may be implemented onboard the satellite, or as shown, it may be implemented at the gateway station as a GBBF 320.

In one example, the criteria for the multiple layers of cells may be reflected in respective beam weights or sets of beam weights. In one example, the beam weights may be generated in a number of different manners by one or more beam-weight generators (BWGs) 322, which without loss of generality may be or otherwise include antenna optimization tool. Similar to the beamformer, the BWG may be implemented onboard the satellite 302 or at the gateway station 304, and in one example the BWG may include a BWG for each layer. The beam weights may be loaded onto or otherwise received by the GBBF 320, which may then use the beam weights to form multiple layers of beams corresponding to respective layers of cells. The GBBF may output the multiple layers of beams to the satellite via respective beamports. In one example, the beamports may be divided into sets of beamports for respective layers of cells, with each cell in a layer being associated with a respective beamport.

In one example, types of user terminals 306 may be assigned to respective sets of beamports, and may thereby be assigned to respective layers of cells. This assignment may be made to assign each type of user terminal to a layer of cells whose criteria are optimized for it. In one example, the assignment may be made according to a resource allocation plan, which may be generated offline and periodically updated. In the assignment, different types of user terminals may be distinguished in any of a number of different manners, such as in the manners described above. In one more particular example, different types of user terminals may be distinguished in accordance with terminal types defined by the GEO-Mobile Radio Interface (GMR) standard.

In the forward direction, signals from the network 308 may be sent to the GBBF 320 via the SBSS and CN 312. The GBBF may apply the appropriate beam weight or set of beam weights to the signals, and then forward the signals to the satellite 302 via the RFE 314. The satellite may then provide the signals to the appropriate user terminal 306 in a spot beam 318 in the coverage area. In the return direction, the GBBF may receive signals from the user terminal via the satellite and RFE. The GBBF may use the appropriate beam weight or set of beam weights to strengthen these user signals, which may then continue to the network for processing and routing. Notably, the layers of cells may be transparent to the GBBF, which may apply the beam weights or sets of beam weights without specific knowledge of their association with the layers. The GBBF may, however, require sufficient beamports to support the layers of cells.

Briefly now returning to FIG. 1, the cellular communication system 100 may be configured to overlap the layers of cells in any of a number of different manners. In various examples, the beams may support communication (transmission or reception) of control and traffic channels in the cellular communication system. In one example, the system may increase system capacity by a more-efficient frequency reuse scheme for control and traffic channels. In accordance with example implementations, higher-order cell frequency reuse patterns may be used to increase traffic capacity while avoiding control-channel overhead that may otherwise be associated with the higher-order reuse pattern.

In accordance with one aspect of example implementations, the cellular communication system 100 may be configured to provide two layers of overlapping cells in respective P-cell and Q-cell frequency reuse patterns. The P-cell frequency reuse pattern may be for communication of traffic channels and control channels of the cellular communication system, and the Q-cell frequency reuse pattern may be for communication of traffic channels exclusive of (without) control channels of the cellular communication system.

Figure 6:
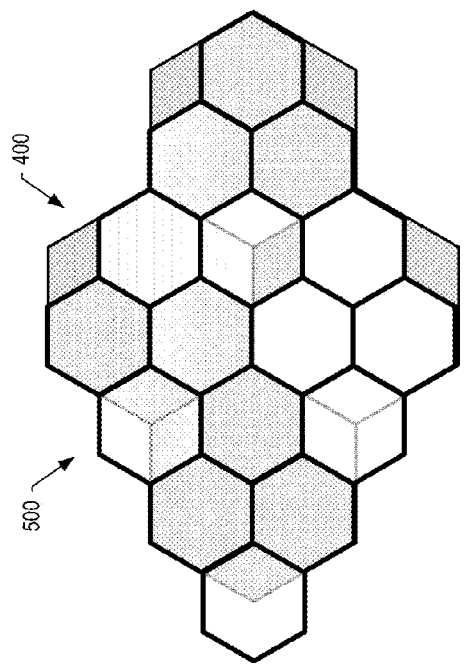
FIGS. 4, 5 and 6 illustrate beams laid down in overlapping frequency reuse patterns according to one aspect of example implementations of the present disclosure.
Figure 4:
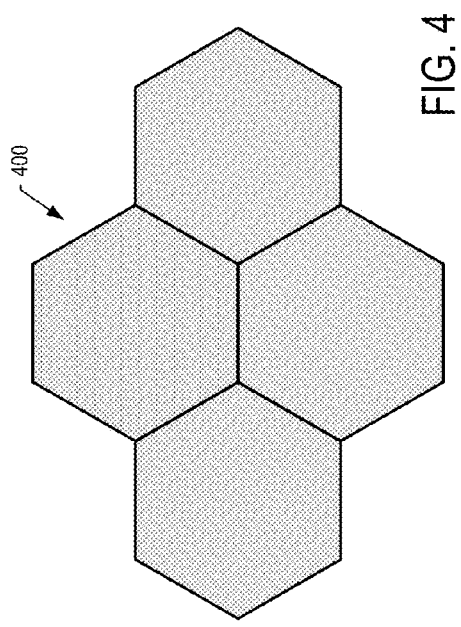
Figure 5:
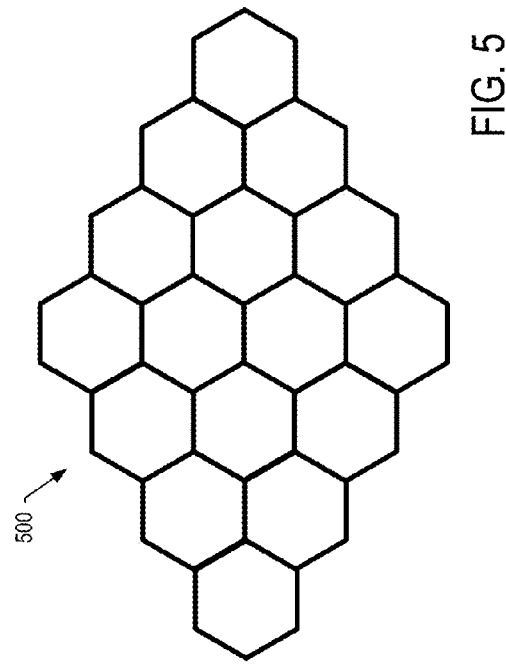

In one example, Q may be greater than P, and cells of the Q-cell frequency reuse pattern may be smaller in size than those of the P-cell frequency reuse pattern. In one example, at least some of the cells of the Q-cell frequency reuse pattern may overlap one cell of the P-cell frequency reuse pattern, and other cells of the Q-cell frequency reuse pattern may overlap more than one cell of the P-cell frequency reuse pattern. FIGS. 4, 5 and 6 illustrate one example of the above aspect in which P=4 and Q=16. In this regard, FIG. 4 illustrates a 4-cell frequency reuse pattern 400 of one layer of cells, FIG. 5 illustrates a 16-cell frequency reuse pattern 500 of another layer of cells, and FIG. 6 illustrates one example manner by which the 16-cell frequency reuse pattern may overlap the 4-cell frequency reuse pattern. As shown by this example, traffic channels of the 16-cell frequency reuse pattern may be covered by control channels of only a 4-cell frequency reuse pattern.

According to this aspect of example implementations, any traffic channel of the layer of cells including the P-cell frequency reuse pattern may be assignable through a control channel of the other layer of cells including the Q-cell frequency reuse pattern. In the case of the cellular communication system 100 of FIG. 1, a ground base station 104 or user terminal 106 within a cell of the P-cell frequency reuse pattern may be assigned through a respective control channel to a traffic channel of a cell of the Q-cell frequency reuse pattern overlapping the respective cell of the P-cell frequency reuse pattern, such as based on the location of the mobile station or user terminal. The location may be known or may be determined such as by Global Positioning System (GPS), assisted GPS (A-GPS) or the like. The cellular communication system of this example may therefore provide Q-cell frequency reuse pattern for traffic channels, but only require a fewer, P-cell frequency reuse pattern for control channels covering the respective traffic channels. For more information on this aspect, see U.S. patent application Ser. No. 13/734,030, entitled: Staggered Cells for Wireless Coverage, filed on Jan. 4, 2013, the content of which is hereby incorporated by reference in its entirety.

Figure 7:
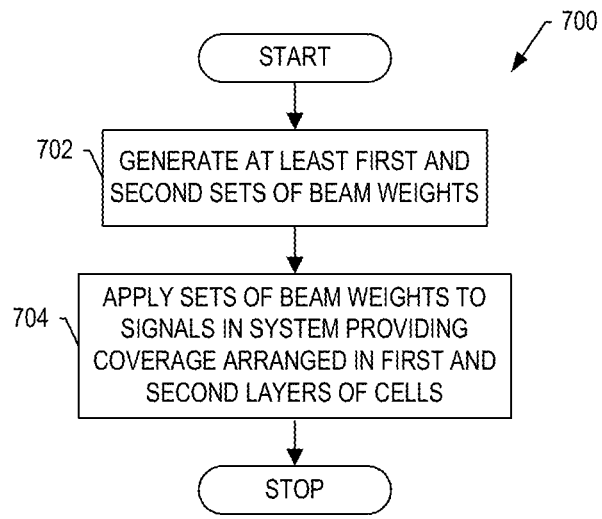
FIGS. 7 and 8 illustrate flowcharts including various operations in methods of aspects of example implementations of the present disclosure.

FIG. 7 illustrates a flowchart including various operations in a method 700 of one aspect of example implementations of the present disclosure. As shown in blocks 702, 704 the method of this aspect includes generating a plurality of beam weights including at least first and second sets of beam weights, and applying the first and second sets of beam weights to signals in a cellular communication system. The cellular communication system provides coverage over a geographic region divided into cells arranged in overlapping first and second layers of cells having criteria optimized for communication by respective, distinct first and second types of user terminals. In this regard, the criteria may be reflected in the first and second sets of beam weights.

Figure 8:
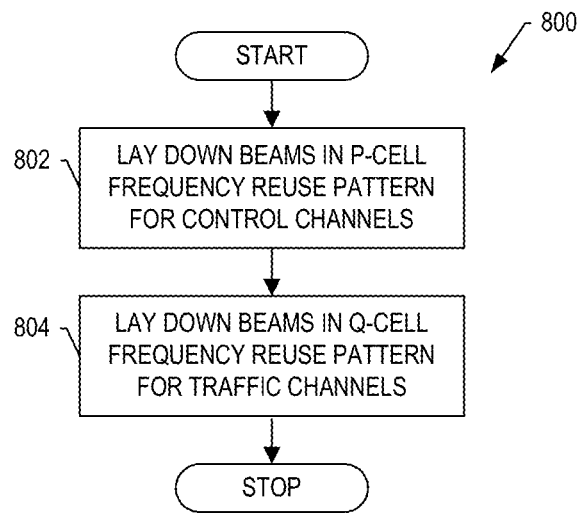

FIG. 8 illustrates a flowchart including various operations in a method 800 of one aspect of example implementations of the present disclosure. As shown in blocks 802, 804 the method of this aspect includes laying down beams of an antenna system covering respective cells of a cellular communication system, with the beams being laid down in overlapping P-cell and Q-cell frequency reuse patterns. The P-cell frequency reuse pattern may be for communication of control channels of the cellular communication system, and the Q-cell frequency reuse pattern may be for communication of traffic channels exclusive of control channels of the cellular communication system. According to this aspect, any traffic channel of the Q-cell frequency reuse pattern may be assignable through a control channel of the P-cell frequency reuse pattern.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
   a beam-weight generator configured to generate a plurality of beam weights including at least first and second sets of beam weights; and
   a beamformer coupled to the beam-weight generator and configured to apply the first and second sets of beam weights to signals in a cellular communication system providing coverage over a geographic region divided into cells arranged in overlapping first and second layers of cells having criteria optimized for communication by respective, distinct first and second types of user terminals, the criteria being reflected in the first and second sets of beam weights;
   wherein the criteria include satellite-antenna criteria, cell size and frequency reuse pattern, the satellite-antenna criteria include antenna gain and side-lobe suppression, and
   wherein the first layer of cells includes first-sized cells arranged in a first frequency reuse pattern, and is optimized for antenna gain, and the second layer of cells includes second-sized cells arranged in a different, second frequency reuse pattern, and is optimized for side-lobe suppression, and
   wherein the second-sized cells are smaller in size than the first-sized cells.

2. The system of claim 1, wherein the first and second layers of cells have different antenna gain and side-lobe suppression.

3. The system of claim 1, wherein the first and second layers of cells are arranged in overlapping P-cell and Q-cell frequency reuse patterns, the P-cell frequency reuse pattern being for communication of control channels, and the Q-cell frequency reuse pattern being for communication of traffic channels exclusive of control channels,
   wherein any traffic channel of the Q-cell frequency reuse pattern is assignable through a control channel of the P-cell frequency reuse pattern.

4. The system of claim 3, wherein Q is greater than P, and cells of the Q-cell frequency reuse pattern are smaller in size than those of the P-cell frequency reuse pattern.

5. The system of claim 3, wherein at least some of the cells of the Q-cell frequency reuse pattern overlap one cell of the P-cell frequency reuse pattern, and other cells of the Q-cell frequency reuse pattern overlap more than one cell of the P-cell frequency reuse pattern.

6. The system of claim 1, wherein the plurality of beam weights further include a third set of beam weights,
   wherein the beamformer is configured to further apply the third set of beam weights to signals in the cellular communication system providing coverage over the geographic region divided into cells arranged in overlapping first, second and third layers of cells having criteria optimized for communication by respective, distinct first, second and third types of user terminals, the criteria being reflected in the first, second and third sets of beam weights.

7. The system of claim 6, wherein
   the third layer of cells includes third-sized cells arranged in a different, third frequency reuse pattern, and is optimized for side-lobe suppression, and
   wherein the first-sized cells are smaller in size than the third-sized cells, and the second-sized cells are smaller in size than the first-sized cells.

8. A method comprising:
   generating a plurality of beam weights including at least first and second sets of beam weights; and
   applying the first and second sets of beam weights to signals in a cellular communication system providing coverage over a geographic region divided into cells arranged in overlapping first and second layers of cells having criteria optimized for communication by respective, distinct first and second types of user terminals, the criteria being reflected in the first and second sets of beam weights;
   wherein the criteria include satellite-antenna criteria, cell size and frequency reuse pattern, the satellite-antenna criteria include antenna gain and side-lobe suppression, and
   wherein the first layer of cells includes first-sized cells arranged in a first frequency reuse pattern, and is optimized for antenna gain, and the second layer of cells includes second-sized cells arranged in a different, second frequency reuse pattern, and is optimized for side-lobe suppression, and
   wherein the second-sized cells are smaller in size than the first-sized cells.

9. The method of claim 8,
   wherein the first and second layers of cells have different antenna gain and side-lobe suppression.

10. The method of claim 8, wherein the first and second layers of cells are arranged in overlapping P-cell and Q-cell frequency reuse patterns, the P-cell frequency reuse pattern being for communication of control channels, and the Q-cell frequency reuse pattern being for communication of traffic channels exclusive of control channels, wherein any traffic channel of the Q-cell frequency reuse pattern is assignable through a control channel of the P-cell frequency reuse pattern.

11. The method of claim 10, wherein Q is greater than P, and cells of the Q-cell frequency reuse pattern are smaller in size than those of the P-cell frequency reuse pattern.

12. The method of claim 10, wherein at least some of the cells of the Q-cell frequency reuse pattern overlap one cell of the P-cell frequency reuse pattern, and other cells of the Q-cell frequency reuse pattern overlap more than one cell of the P-cell frequency reuse pattern.

13. The method of claim 8, wherein the plurality of beam weights further include a third set of beam weights,
wherein applying the first and second sets of beam weights further includes applying the third set of beam weights to signals in the cellular communication system providing coverage over the geographic region divided into cells arranged in overlapping first, second and third layers of cells having criteria optimized for communication by respective, distinct first, second and third types of user terminals, the criteria being reflected in the first, second and third sets of beam weights.

14. The method of claim 13, wherein
the third layer of cells includes third-sized cells arranged in a different, third frequency reuse pattern, and is optimized for side-lobe suppression, and
wherein the first-sized cells are smaller in size than the third-sized cells, and the second-sized cells are smaller in size than the first-sized cells.

* * * * *